3,087,773
Patented Apr. 30, 1963

3,087,773
LINEAR POLYESTER MATERIALS DYED WITH ANTHRAQUINONE DYES
James M. Straley and Ralph R. Giles, Kingsport, Tenn., assignors to Eastman Kodak Company, Rochester, N.Y., a corporation of New Jersey
No Drawing. Filed Dec. 24, 1959, Ser. No. 861,742
9 Claims. (Cl. 8—39)

This invention relates to textile materials having a basis of a linear polyester having a melting point of at least 200° C. dyed in bright red and bluish-red shades having good fastness properties.

For purposes of simplification the term polyester will be used hereinafter to refer to "a linear polyester having a melting point of at least 200° C."

The problem of obtaining dyes which will dye polyester materials shades, particularly red shades, which are fast to light, washing and sublimation is of great practical importance. It is known that the cellulose acetate dyes frequently have affinity for polyester textile materials. Many of the cellulose acetate azo dyes commonly in use yield dyeings on polyester textile materials which have good fastness to sublimation and washing but their light fastness is inadequate, particularly in pastel shades. A few of the anthraquinone dyes for cellulose acetate yield dyeings on polyester textile materials which have good light fastness but poor fastness to sublimation.

Fastness to sublimation is of real significance in the processing of polyester textile materials because they are frequently subjected to a so-called "heat-setting" operation. This operation is usually applied to polyester fabrics after dyeing. In this operation the fabrics are often heated to 375–400° F. and if a dye is not fast to sublimation some of it will sublime from the fiber and contaminate the equipment. So far as we are aware no one prior to our invention or discovery has provided a dye which dyes polyester textile materials red shades which are fast to light, washing and sublimation.

We have discovered that the anthraquinone compounds having the formula:

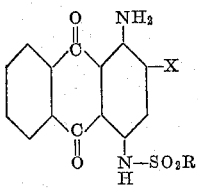

wherein X represents a member selected from the group consisting of a bromine atom, an alkoxy group having 1 to 8 carbon atoms, a β-methoxyethoxy group and a β-ethoxyethoxy group and R represents a monocyclic aryl nucleus of the benzene series devoid of a water-solubilizing group dye polyester textile materials red or bluish-red shades which have good fastness to light, washing and sublimation. The compounds wherein X is a bromine atom yield bluish-red shades while the remaining compounds yield red shades.

Linear polyester fibers having a melting point of at least 200° C. include polyethylene terephthalate fibers sold on the market under the E. I. du Pont de Nemours and Company trademark "Dacron" and the polyester fibers sold on the market under the Eastman Kodak Company trademark "Kodel." The latter fibers are more particularly described in Kibler, Bell and Smith U.S. Patent 2,901,466. "Dacron" polyester fibers are described, for example, in Winfield and Dickens, U.S. Patent 2,465,319. The dyeing of other linear polyester fibers having a melting point of at least 200° C. in addition to those specifically mentioned is included within the scope of our invention.

The anthraquinone compounds employed by us are not broadly new. 1 - amino - 2 - methoxy - 4 - p - toluenesulfonamidoanthraquinone is disclosed, for example, on page 203 of volume II, of FIAT Final Report No. 1313 [PB No. 85,172]. Similarly 1-amino-2-bromo-4-p-toluenesulfonamidoanthraquinone is disclosed in Ber., vol. 49, page 2166. These compounds have not proved to be satisfactory for the dyeing of nylon and cellulose acetate. Thus, it is all the more surprising that they are excellent dyes for linear polyesters having a melting point of at least 200° C. It is also to be noted that 1-amino-2-methoxy-4-aminoanthraquinone and 1-amino-2-bromo-4-aminoanthraquinone do not have the required fastness properties on polyester fibers, particularly with respect to sublimation.

The 1 - amino - 2 - bromo - 4 - arylsulfonamidoanthraquinone compounds are prepared by reacting 1-amino-2,4-dibromoanthraquinone with a benzenesulfonamide compound in the presence of an acid acceptor such as potassium acetate and a copper catalyst such as copper acetate. The reaction is carried out in the presence of an inert solvent such as amyl alcohol.

The compounds wherein X is an alkoxy group having 1 to 8 carbon atoms, a β-methoxyethoxy group or a β-ethoxyethoxy group can be prepared from the corresponding 2-bromo compounds by replacing the 2-bromo atom with the alkoxy and alkoxyalkoxy groups just mentioned. This is done by treating the 2-bromo compound with a solution of metallic sodium in the appropriate alcohol. This reaction is well known to those skilled in the dye art. Thus methyl alcohol, ethyl alcohol and 2-ethylhexanol are used, for example, to replace the 2-bromo atom with methoxy, ethoxy and 2-ethylhexoxy, respectively.

The compounds wherein X is an alkoxy group having 1 to 8 carbon atoms, a β-methoxyethoxy group or a β-ethoxyethoxy group can also be prepared by reacting 1-amino-4-bromoanthraquinone-2-sodium sulfonate with a benzenesulfonamide compound in the presence of potassium acetate or potassium carbonate and a copper catalyst such as copper sulfate ($CuSO_4 \cdot 5H_2O$) or copper acetate to obtain a 1-amino-4-benzenesulfonamidoanthraquinone-2-potassium sulfonate compound which upon treatment with potassium hydroxide in the appropriate alcohol yields the desired compounds.

Dyeing is carried out in accordance with known methods for dyeing polyester textile materials. The methods disclosed in U.S. Patents 2,757,064 and 2,880,050, for example, can be used.

The following examples illustrate the invention and the manner in which the anthraquinone compounds employed as dyes are prepared.

*Example 1*

10 grams of $CuSO_4 \cdot 5H_2O$, 300 grams of 1-amino-4-bromoanthraquinone-2-sodium sulfonate, 150 grams of p-toluenesulfonamide and 55 grams of $K_2CO_3$ were added with stirring to 7 liters of water. The reaction mixture thus obtained was heated to 97° C. over a period of about 2 hours and then held at 96–98° C. for 12 hours, while stirring. The reaction mixture was then cooled to 30° C. and filtered. The 1-amino-4-p-toluenesulfonamidoanthraquinone-2-potassium sulfonate collected on the filter was washed with 3 liters of 2% KCl and then with 2 cold water washes. Upon drying to a constant weight of 110–120° C. a yield varying from 310 to 320 grams is obtained.

An amount of 1-amino-4 - bromoanthraquinone - 2 - sodium sulfonate equivalent to 240 grams of the free acid was employed. This compound can be purchased as "Bromamine Acid" and assays 80–85% as free acid.

250 grams of flake KOH were dissolved in 500 grams of methyl alcohol with cooling. 102 grams of 1-amino-4-p-toluenesulfonamidoanthraquinone-2 - potassium sulfonate were added at 60–65° C. over a period of ½ hour with vigorous stirring. The reaction mixture thus obtained was stirred at moderate reflux (87–89° C.) for 4 hours and then drowned in 2800 cc. of cold water with stirring and filtered. The blue potassium salt collected on the filter was washed 6 times with hot water. The wet cake weighing about 300 grams was added to 2500 cc. of water at 80–90° C. with good stirring, neutralized to a pH of 5–7 with acetic acid and filtered. The 1-amino-2-methoxy-4-paratoluenesulfonamidoanthraquinone collected on the filter was washed with hot water until neutral. A yield of about 72 grams, dry basis, was obtained.

*Example 2*

8.8 grams of 1-amino-4-bromoanthraquinone-2-sodium sulfonate, 3.7 grams of p-ethylbenzenesulfonamide, 2.36 grams of potassium acetate and 0.1 gram of copper acetate crystals were refluxed together for 4 hours with good stirring. The reaction mixture was then cooled to 25° C. and the solid product formed was recovered by filtration, washed well with cold water and dried. Five grams of the product thus obtained were added, with good stirring, in portions over a period of 1 hour at 80° C. to a melt prepared from 15 grams of KOH in 30 cc. of methyl alcohol. After stirring for 1½ to 2 hours longer at 80–82° C. the reaction mixture was cooled to 40° C. and run into 500 cc. of cold water. The reaction product which precipitated was recovered by filtration, washed with water of 80° C. and then dried. The 1-amino-2-methoxy-4-(p-ethylphenyl)sulfonamidoanthraquinone obtained dyes polyester textile materials such as Dacron and Kodel polyester fibers beautiful red shades having excellent fastness to light, washing and sublimation.

*Example 3*

3.81 grams of 1-amino-2,4-dibromoanthraquinone, 2.3 grams of p-ethylbenzenesulfonamide, 1.18 grams of potassium acetate, 0.01 gram of copper acetate crystals and 25 cc. of amyl alcohol were refluxed together with stirring for 3 hours. The reaction mixture was cooled to 25° C. and filtered. The product collected on the filter was washed with a little cold methyl alcohol, then with hot water and dried. Three grams of the product thus obtained was added with stirring at 30° C. to a solution prepared from 5 grams of metallic sodium in 65 cc. of methyl Collosolve. The temperature was then raised to 90–95° C. and held there for 1 hour. The reaction mixture was then cooled to 25° C., diluted with 100 cc. of hot water and cooled to room temperature. The reaction product was recovered by filtration, washed with hot water and recrystallized from acetic acid. The 1-amino-2-β-methoxyethoxy - 4 - (p - ethylphenyl)sulfonamidoanthraquinone thus obtained dyes polyester textile materials such as Dacron and Kodel polyester fibers red shades having excellent fastness to light, washing and sublimation.

*Example 4*

3.81 grams of 1-amino-2,4-dibromoanthraquinone, 2.84 grams of 4-chloro-3-nitrobenzenesulfonamide, 1.18 grams of potassium acetate, 1 crystal of copper acetate and 40 cc. of amyl alcohol were refluxed together with stirring for 3 hours. The reaction mixture was cooled and the reaction product which precipitated was recovered by filtration, washed with cold methyl alcohol, then with water and dried at 110° C. 3.75 grams of 1-amino-2-bromo-4-(4-'-chloro - 3' - nitrophenyl)sulfonamidoanthraquinone were obtained. It dyes polyester textile materials such as Dacron and Kodel polyester fibers beautiful bluish-red shades having excellent fastness to light, washing and sublimation.

Following the procedure described hereinbefore the dyes indicated hereinafter are readily prepared.

| X | R |
| --- | --- |
| methoxy | p-(n-propyl) phenyl |
| Do | p-(n-butyl) phenyl |
| Do | 2,5-dimethoxyphenyl |
| Do | p-chlorophenyl |
| Do | phenyl |
| Do | p-cyclohexylphenyl |
| ethoxy | p-methylphenyl |
| Do | phenyl |
| Do | p-methoxyphenyl |
| β-methoxyethoxy | phenyl |
| Do | p-methylphenyl |
| Do | 3,4-dichlorophenyl |
| β-ethoxyethoxy | phenyl |
| Do | p-methylphenyl |
| Do | p-ethoxyphenyl |
| bromine | phenyl |
| Do | o-methylphenyl |
| Do | p-methylphenyl |
| Do | p-ethylphenyl |
| Do | p-(n-butyl) phenyl |
| Do | 4-hydroxy-3-nitrophenyl |
| Do | p-acetaminophenyl |
| Do | p-aminophenyl |
| Do | p-acetophenyl |
| Do | p-(n-propionyl) phenyl |
| Do | p-(N-CCH$_2$CH$_3$) phenyl (H, ‖O) |
| Do | p-butyrylaminophenyl |
| Do | p-diphenyl |
| Do | 2,5-dimethoxyphenyl |
| Do | m-methylsulfonylphenyl |
| Do | p-caproylamidophenyl |

*Example 5*

0.3 gram of a 33.3% dispersion of 1-amino-2-methoxy-4-p-toluenesulfonamidoanthraquinone were added to 50 cc. of cold water and stirred until completely wet out. One cc. of a 2% Igepon T solution was added and the dyebath was brought to a volume of 300 cc. with water. Three cc. of Dacronyx (a chlorinated benzene emulsion) were added and 10 grams of a textile fabric made of Kodel polyester fibers were entered. The fabric was worked 10 minutes without heat and then for 10 minutes at 80° C. The dyebath was then brought to the boil and held at the boil for one hour. Following this the fabric was rinsed in warm water, then scoured in a 0.2% soap, 0.2% soda-ash solution at 80° C. After scouring the fabric was rinsed with water and dried. The fabric was dyed a beautiful red shade having excellent fastness to light, washing and sublimation.

A similar result is obtained when the fabric is made of Dacron polyester fibers.

*Example 6*

Example 5 was repeated using 1-amino-2-bromo-4-p-toluenesulfonamidoanthraquinone as the dye compound. The textile fabrics made of Kodel and Dacron polyester fibers were dyed a beautiful bluish-red shade having good to excellent fastness to light, washing and sublimation.

Any of the dispersing agents, such as sodium lignin sulfonate, for example, customarily used to disperse water-insoluble cellulose acetate dyes can be used to prepare the dispersed dye. Other carriers, such as methyl salicylate, methyl terephthalate and o-phenylphenol, for example, can be used instead of the Dacronyx employed in Examples 5 and 6.

The polyester materials can also be dyed under pressure using known techniques. The textile material may be dyed in any desired form, for example, in the form of yarn, filament, staple fiber or fabric.

The invention has been described in detail with particular reference to preferred embodiments thereof, but it will be understood that variations and modifications can be effected within the spirit and scope of the invention as described hereinabove and as defined in the appended claims.

We claim:

1. Textile material having a basis of a linear polyester having a melting point of at least 200° C. dyed with an anthraquinone compound having the formula:

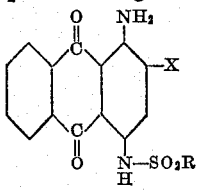

wherein X represents a member selected from the group consisting of a bromine atom, an alkoxy group having 1 to 8 carbon atoms, a β-methoxyethoxy group and a β-ethoxyethoxy group and R represents a monocyclic aryl nucleus of the benzene series devoid of a water-solubilizing group.

2. Textile material according to claim 1 wherein X is the methoxy group.

3. Textile material according to claim 1 wherein X is a bromine atom.

4. Linear polyester fibers having a melting point of at least 200° C. dyed with an anthraquinone compound having the formula set forth in claim 1.

5. Textile material having a basis of a linear polyester having a melting point of at least 200° C. dyed with 1-amino-2-methoxy-4-p-toluenesulfonamidoanthraquinone.

6. Textile material having a basis of a linear polyester having a melting point of at least 200° C. dyed with 1-amino-2-bromo-4-p-toluenesulfonamidoanthraquinone.

7. Textile material having a basis of a linear polyester having a melting point of at least 200° C. dyed with 1-amino-2-methoxy-4-phenylsulfonamidoanthraquinone.

8. Textile material having a basis of a linear polyester having a melting point of at least 200° C. dyed with 1-amino-2-β-methoxyethoxy - 4 - phenylsulfonamidoanthraquinone.

9. Textile material having a basis of a linear polyester having a melting point of at least 200° C. dyed with 1-amino - 2 - bromo-4(4'-chloro-3'-nitrophenyl)sulfonamidoanthraquinone.

References Cited in the file of this patent
UNITED STATES PATENTS

| | | |
|---|---|---|
| 1,736,088 | Nawiasky | Nov. 19, 1929 |
| 1,964,971 | Albrecht | July 3, 1934 |
| 2,640,059 | Salvin et al. | May 26, 1953 |
| 2,757,064 | Speck | July 31, 1956 |
| 2,880,050 | Fortess et al. | Mar. 31, 1959 |
| 2,937,190 | Straely et al. | May 17, 1960 |

OTHER REFERENCES

Dorset: The Textile Manufacturer, April 1958, pp. 203–204.

Lubs: The Chemistry of Synthetic Dyes and Pigments, 1955, pages 347, 370.

Schroeder: Text, Res. J., April 1957, pp. 275-285.